UNITED STATES PATENT OFFICE.

SIGVALD ALFRED CHRISTIAN KRISTENSEN, OF COPENHAGEN, DENMARK.

PRODUCTION OF MATRICES FOR STEREOTYPING AND THE LIKE.

No. 860,671.   Specification of Letters Patent.   Patented July 23, 1907.

Application filed August 1, 1906. Serial No. 328,737.

*To all whom it may concern:*

Be it known that I, SIGVALD ALFRED CHRISTIAN KRISTENSEN, printer, a subject of the King of Denmark, whose postal address is Nytorv 17, Copenhagen, Denmark, have invented new and useful Improvements in the Production of Matrices for Stereotyping and the Like, of which the following is a specification.

In my United States Patent No. 840,775 is described a process for the production of matrices for reproduction, by stereotyping, of etchings, galvanos or the like, separately or inserted in the text.

The essential feature of the said process consists in providing a matrix having a metallic film or skin on its face. The preferred manner of producing such a matrix is described in the patent, and consists in applying a liquid containing a fine metallic powder to the form, and pressing the form and flong together to form the matrix, the latter when removed carrying the metallic film on its face.

The present invention relates to a liquid compound especially adapted for the above mentioned use and consisting partly of finely pulverized aluminium, partly of an adhesive and partly of a liquid and volatile solvent or suspending medium.

As an adhesive is used, according to the present invention, a substance or a mixture of substances containing starch (such as rice starch, rye flour, maize (Indian corn)-flour or wheat flour) and forming with moisture and under the influence of heat a gelatinous mass, adapted to resist the heat, produced by the subsequent casting of the stereotype metal. Also certain kinds of glue, especially the genuine isinglass may advantageously be employed for this purpose.

As a solvent, or rather as a medium to hold the aluminium powder and the adhesive in suspension, alcohol, ether and several hydrocarbons as for instance benzine, are eminently suitable, whereas water is entirely unfit for the purpose. The said fluids, save water, are namely both sufficiently volatile to admit of a quick evaporation and extremely liquid, flowing easily on metal and adhering thereto. They will therefore, when they are mixed up with the solid substances completely eliminate the air from the same, and when the solution is applied on the etching or the like, the air will also be entirely expelled from even the finest cavities of the form, and the film or skin produced on the surface of the form will closely fit the same, when the fluid has evaporated.

In carrying my invention into effect I prefer to compose the solution of the following ingredients in about the following proportions, viz. 2 parts by weight of rye flour, 1 part of maize flour, 1 part of aluminium powder and sufficient alcohol to make the mixture quite liquid.

Preferably the solid ingredients are first mixed, and to this mixture is added the liquid, little by little, until the mass gets a liquid consistency. The solution thus prepared may be preserved for any length of time, when kept in well stoppered bottles or cans, and it will at all times be ready for use, it being only necessary to shake it somewhat, in order to mix the ingredients evenly.

The solution may be applied to the surface of the form, by putting it onto the form by means of a soft brush, by sprinkling or pouring it thereon, or in other suitable manner. It may also be applied to the paper-flong as well, no matter whether this is in a dry or damp state, especially when the flong is to be used for the reproduction of forms, the cavities of which are not of the very finest description. After having been coated with the solution the matrix may be applied to the form as soon as the fluid is evaporated, or it may be entirely dried and kept in stock for any length of time and is always ready for use, after having been wetted with water as an ordinary paper-flong.

Having now particularly described and ascertained the nature of my said invention and in what manner the same is to be performed, I wish it to be understood that I am aware, that it is not novel to produce matrices from etchings and the like by giving the form or the paper-flong a coating by applying to the same a powder such as whiting, powdered clay, plumbago or the like, either dry or in paste form, and I make no claim to such processes *per se*, but What I do claim is:—

1. A compound for producing a metallic skin on the face of a matrix for stereotyping consisting of a metallic powder, a heat-resisting adhesive and a volatile liquid carrier.

2. A compound for producing a metallic skin on the face of a matrix for stereotyping, consisting of aluminium powder, a heat-resisting adhesive, and a volatile liquid carrier.

3. A compound for producing a metallic skin on the face of a matrix for stereotyping, consisting of a metallic powder, starch, and a volatile liquid carrier.

4. A compound for producing a metallic skin on the face of a matrix for stereotyping, consisting of a metallic powder, starch, and alcohol.

5. A solution or liquid compound for producing a metallic film or skin on the face of a matrix for the reproduction, by stereotyping, of type matter, etchings, electrotypes, woodcuts and the like, consisting of a fine aluminium powder and a starchy substance held in suspension or stirred up in a suitable volatile and preferably highly liquid carrier.

In witness whereof, I have hereunto signed my name in the presence of two subscribing witnesses.

SIGVALD ALFRED CHRISTIAN KRISTENSEN.

Witnesses:
  JULIUS LEHMANN,
  HERMAN REL.